Nov. 18, 1952     H. L. BARBER ET AL     2,618,027
APPARATUS FOR MAKING APPLICATOR SWABS Filed April 20, 1949     7 Sheets-Sheet 1

Fig. 1

INVENTORS.
Hiram L. Barber
BY George L. Sellars
Wood, Arey, Herron & Evans
ATTORNEYS.

Nov. 18, 1952 H. L. BARBER ET AL 2,618,027
APPARATUS FOR MAKING APPLICATOR SWABS
Filed April 20, 1949 7 Sheets-Sheet 4

Fig. 4

INVENTORS.
Hiram L. Barber
BY George L. Sellars
Wood, Arey, Herron & Evans
ATTORNEYS.

Fig. 5

Nov. 18, 1952     H. L. BARBER ET AL     2,618,027
APPARATUS FOR MAKING APPLICATOR SWABS
Filed April 20, 1949     7 Sheets-Sheet 6

INVENTORS.
Hiram L. Barber
BY George L. Sellars
Wood, Arey, Herron & Evans
ATTORNEYS.

Nov. 18, 1952   H. L. BARBER ET AL   2,618,027
APPARATUS FOR MAKING APPLICATOR SWABS
Filed April 20, 1949   7 Sheets-Sheet 7

INVENTORS.
Hiram L. Barber
George L. Sellars
BY Wood, Arey, Herron & Evans
ATTORNEYS.

Patented Nov. 18, 1952

2,618,027

UNITED STATES PATENT OFFICE 2,618,027

APPARATUS FOR MAKING APPLICATOR SWABS

Hiram L. Barber, Newton, and George L. Sellars, Milford, Ohio

Application April 20, 1949, Serial No. 88,638

20 Claims. (Cl. 19—145)

This invention relates to a machine for making swab sticks, consisting of relatively thin sticks, usually of wood, having cotton swabs wound upon opposite ends and used extensively as medical applicators. The machine fabricates the applicators in an automatic fashion such that applicator sticks and coils of cotton rope are supplied to the machine in bulk, the sticks being advanced continuously and the cotton rope being severed into tufts which are presented to the sticks to be wound upon opposite ends of the sticks by spinning them as they advance. The term "rope" used throughout this specification and in the claims is intended to designate a single strand or roving of cotton fibre stock which has sufficient tensile strength to be pulled into the machine without breaking, but which can be severed or drawn into tufts to form swabs.

Generally described, the machine embodies a constantly rotating conveyor drum, with a hopper adapted to feed the sticks individually to a series of cross slots in the drum whereby the advancing sticks successively encounter a barbing station at which barbs are formed at opposite ends, after which the sticks are engaged by an apparatus which spins them along their longitudinal axes as they advance past a station at which the tufts of cotton are severed from the rope and presented to the opposite ends of the rotating sticks so that the sticks catch the fibers at the leading end of the tuft and wind it rapidly into a swab. After winding, the rotating swabs are reduced to uniform size and shape by passing under spring loaded shoes which frictionally engage the swabs against the conveyor drum to wind the tufts firmly upon the stick, reduce them to uniform size and anchor the cotton fibers upon the barbs to prevent endwise withdrawal of the swabs from the sticks. At completion of this operation, but while still spinning, the sticks encounter a groover which cuts a shallow groove intermediate of the length of the stick to weaken it, whereby the stick may be used either as a double swab applicator or may be broken at the groove by the user to provide two single swab applicator sticks. At completion of the grooving operation, the sticks are discharged from the machine to be sterilized and packaged in sanitary containers for distribution and sale.

One of the primary objects has been to provide a simplified machine which performs all of the necessary operations automatically and which is capable of producing swab sticks of superior quality at a high rate of production. For this purpose the machine operates in a continuous manner, as distinguished from stepwise, and by reason of improvements in structure it is found to be smooth and positive in operation and free from tendency to jam.

A further object has been to provide an improved mechanism for forming the barbs in the sticks, to improve the apparatus for spinning the sticks during swab winding and grooving and to provide a feeder by which the cotton ropes are severed into uniform tuft lengths prior to presentation to the sticks so that the swabs are of uniform size and shape.

The present improvements are based, to a certain extent, upon our co-pending applications, Serial Numbers 638,595, 638,596, and 638,597, now matured into Patents 2,515,392, 2,557,024 and 2,492,027 which relate respectively to apparatus for sorting and testing sticks, machine for making applicator swabs and machine for barbing applicator sticks. The present apparatus relates generally to the subject matter disclosed in these applications but involves refinements and improvements over the structure therein disclosed.

In the present structure, the barbing apparatus is exceptionally simple and effective, being driven by the sticks themselves as they establish a wedging engagement with the barbing blades during continuous advance of the conveyor drum. The cotton feeding station, although relatively simple in design, operates in a positive fashion to measure the required tuft length of cotton and sever it from the rope by continuous advance of a pair of mating feed gears, while a second intermittent pair of feed gears is stationary, the break occurring between the first and second pairs of gears to cause the fibers to string out one from another. Therefore, both the trailing end and the leading end of the cotton tuft are feathered to facilitate the winding and formation of a swab.

The cotton feeding apparatus is equipped with a feeler so arranged that the advance of the cotton rope, which is correlated to the advance of the conveyor drum, is arrested when the feeler encounters a cross slot in the drum which is devoid of an applicator stick. By this arrangement, the advance of a tuft for that particular slot is arrested and the feeding apparatus remains inactive until the feeler again encounters a stick. This prevents a tuft from being advanced unless a stick is in position to pick it up and avoids the possibility of loose tufts of cotton from becoming entangled in the machine to cause mechanical difficulties.

The apparatus for spinning the sticks likewise is simple and yet exceptionally efficient and constitutes loose pulleys interposed in the conveyor drum, driven by belts at a rate greater than the advance of the drum, the sticks being frictionally engaged between the first belts and secondary belt runs outside the drum, the respective belts traveling in directions appropriate to spin the sticks concurrently with their advance by the conveyor drum, to pick up and wind the cotton tufts.

By reason of these and other improvements which are more clearly disclosed in the specification with reference to the drawings, the construction of the machine is simplified, its speed of operation and efficiency is increased and the product is improved materially.

Figure 1:
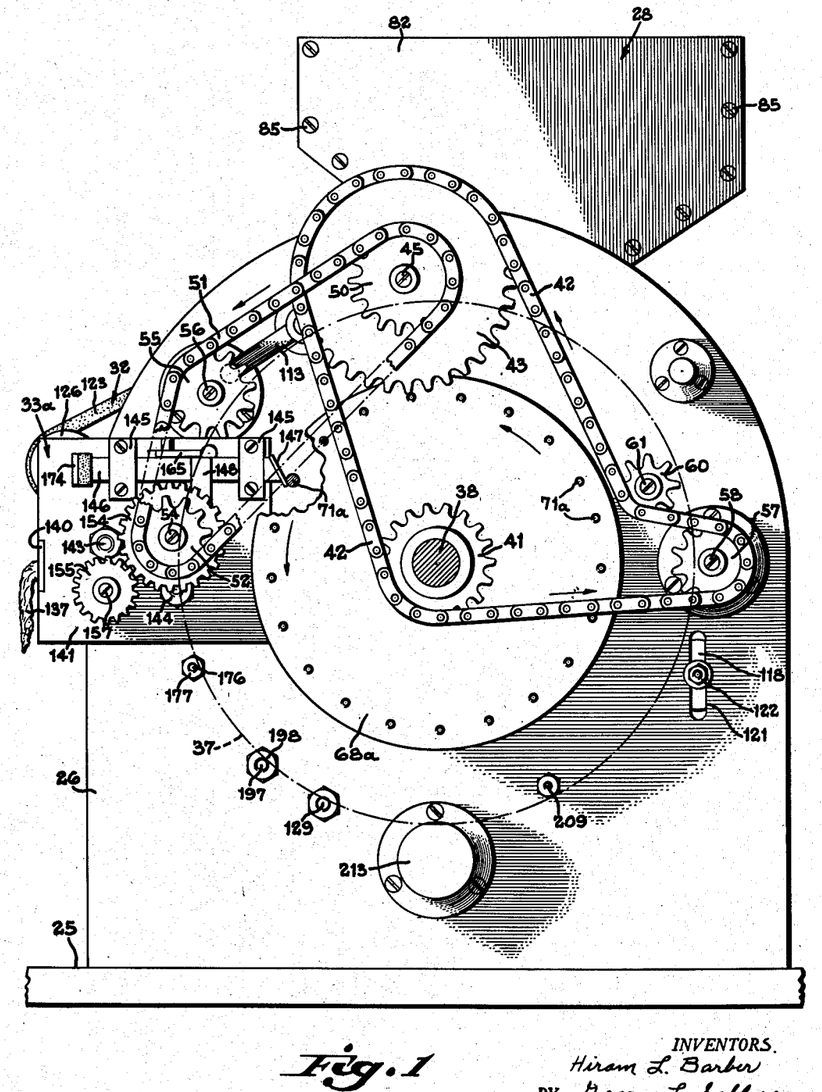
Figure 1 is a general side elevation illustrating the swab forming machine.
Figure 2:
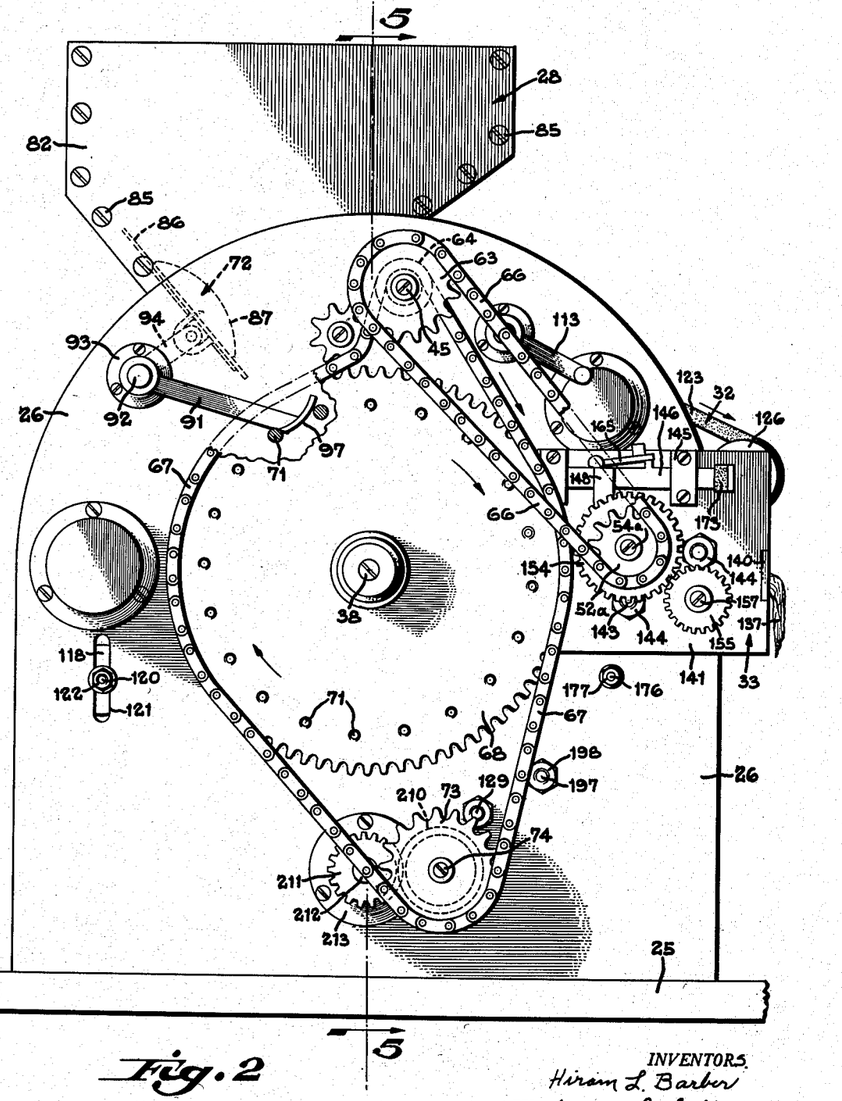
Figure 2 is a view similar to Figure 1, illustrating the opposite side of the machine.
Figure 3:
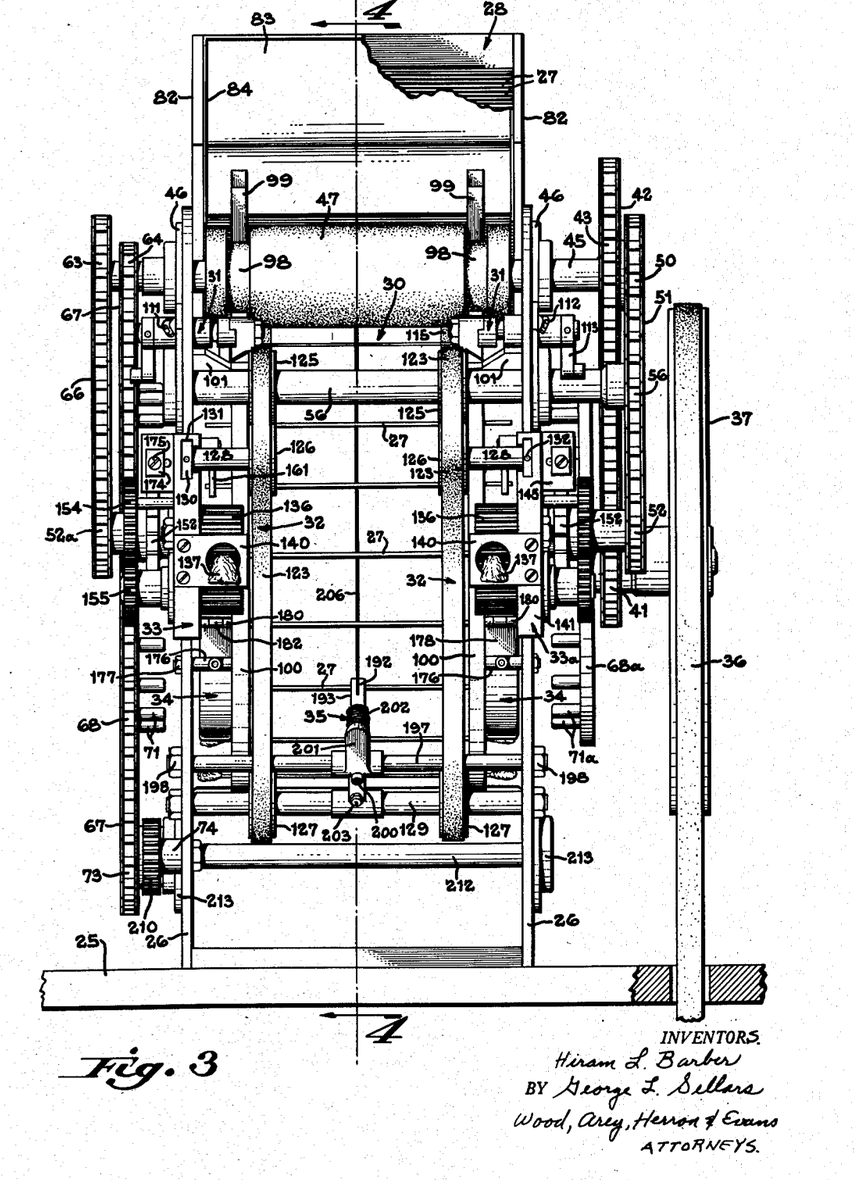
Figure 3 is a general front elevation of the machine.

Described generally with reference to Figures 1, 2 and 3, the machine incorporates a base 25 upon which is mounted a pair of side plates 26—26, spaced to permit the applicator sticks 27 to pass crosswise between the plates with clearance between the plates and the ends of the sticks.

Upon the upper portion of the side plates is mounted a stick hopper indicated at 28 arranged to contain a supply of sticks in position to be fed individually to the conveyor drum 30 which is provided with a series of spaced cross slots adapted to convey the sticks individually through the machine as the drum rotates. The side plates 26 provide bearing supports for the conveyor drum 30 and the various other rotating shafts incorporated in the machine, as hereinafter described. The present machine is designed to form a double ended swab stick which is weakened centrally by a shallow groove so that it may either be used as a double applicator or may conveniently be broken to form two single ended applicators.

Figures 11, 12:
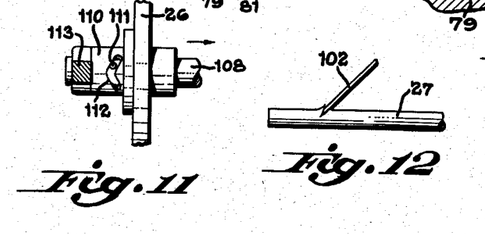
Figure 12 is an enlarged view detailing the barbing blade in operating position relative to the end of a stick.

In operation, the sticks pass from the hopper to the conveyor drum, being held in position on the drum by means hereinafter described, and each stick is carried sequentially past a pair of barbing stations indicated generally at 31—31, the stations automatically forming a barb in the opposite ends of the stick by driving a cutting edge at an angle partially into the stick to sever the wood fibers as shown in Figure 12. These barbs engage the cotton fibers to facilitate winding when the wad lengths of cotton subsequently are wound upon the ends of the stick and also anchor the formed swab upon the stick. After passing the barbing stations, the sticks are frictionally engaged between belts driven in opposite directions to rotate the sticks as they approach the winding stations where a measured length of cotton is presented to the ends of the rotating stick to be wound thereon. The driving apparatus for rotating or spinning the sticks is indicated generally at 32—32 and the winding stations are indicated generally at 33 and 33a.

Each winding station is arranged to sever from a continuous rope of cotton fibers, predetermined lengths or tufts of the rope and to present these to an end of the rotating stick in timed relationship with the advance of the conveyor drum 30, the amount of cotton applied to each stick being substantially uniform. The structure of the driving apparatus 32 and winding mechanism 33 is detailed at a later point in this specification. After passing the winding stations, the ends of the sticks carrying the partially formed cotton swabs pass beneath spring loaded arcuate shoes 34—34 which frictionally engage the swabs to wind them more firmly upon the stick and to shape them uniformly. After this operation, the sticks, while still being rotated, pass a grooving station 35 which is located to form a shallow groove at the center of each stick so that it readily may be broken at the groove. After this operation, the sticks are discharged from the machine ready for packaging.

The stick rotating apparatus 32—32 and cotton feeding stations 33 and 33a are driven in timed relationship with the rotation of the conveyor drum 30 by means of a series of chains and sprockets which provide the desired speed ratio for the various parts of the machine. This apparatus is in duplicate at opposite sides of the machine and the duplicate units are driven at uniform rates so as to perform the same operation simultaneously upon opposite ends of the sticks. In order to comprehend clearly the functions and relationship between the cooperating parts of the machine, the apparatus for driving these components is described in detail prior to a detailed disclosure of the structure and operation of the parts,

Transmission system

Figure 5:
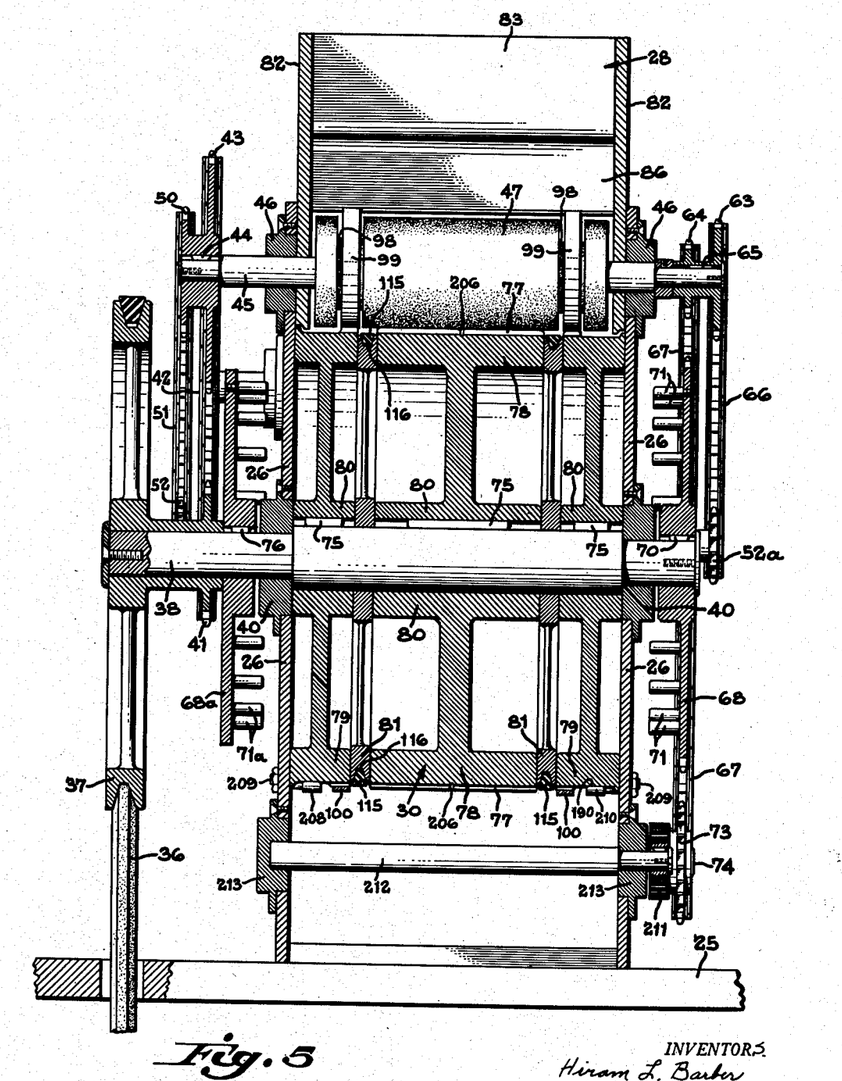
Figure 5 is a sectional view taken on line 5—5, Figure 2, further detailing the apparatus generally.
Figures 14, 15, 18, 19, 20, 21:
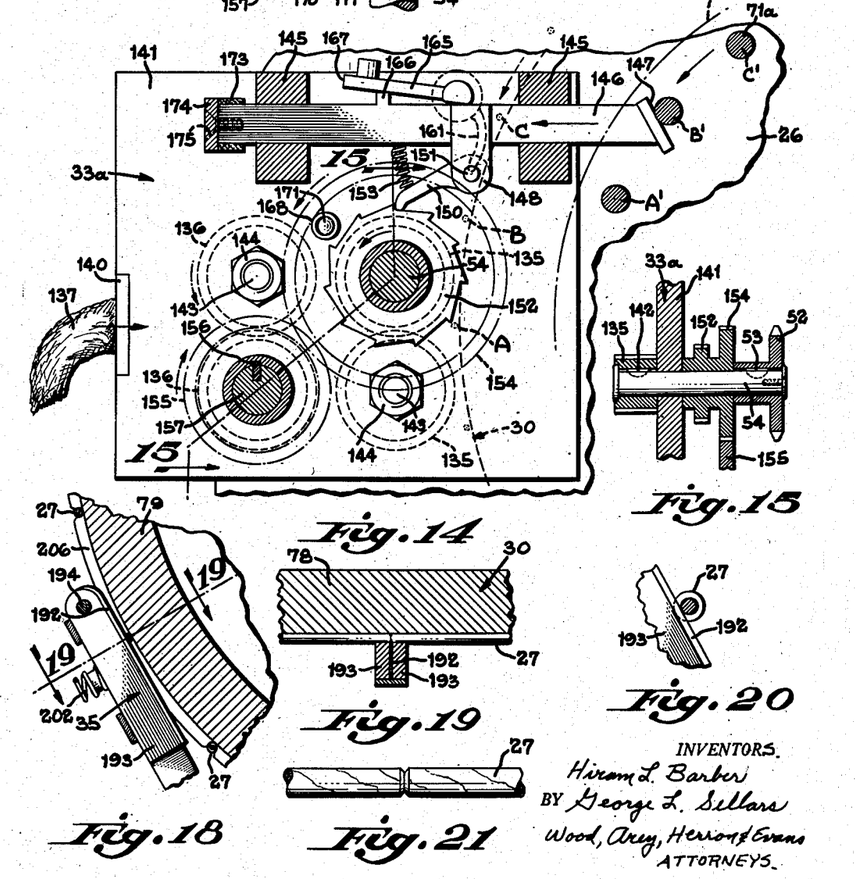
Figure 14 is a sectional view taken on line 14—14, Figure 13, illustrating the mechanism for actuating the cotton feeding apparatus.
Figure 15 is a sectional view taken on line 15—15, Figure 14, detailing the drive sprocket and gearing for the cotton feeding apparatus.
Figure 18 is an enlarged fragmentary sectional view illustrating the grooving blade for partially severing the applicator stick at its center to provide a weakened line adapting the double ended swab stick to be broken to form single swab sticks.
Figure 19 is a sectional view taken on line 19—19, Figure 18, further illustrating the structure shown in Figure 18.
Figure 20 is an enlarged fragmentary view of a portion of the cutting blade and applicator stick, taken from Figure 18.
Figure 21 is an enlarged fragmentary view illustrating the groove formed in the stick.

In the present disclosure, the machine is powered by a motor driven V-belt 36, engaged upon a V-belt pulley 37 which is loosely journalled upon a shaft 38, supported by bearings 40—40 mounted in the side plates 26 of the machine (Figure 5). The pulley 37 includes a small primary drive sprocket 41, rotatable as a unit with the pulley. A sprocket chain 42 is engaged upon sprocket 41 and drives a large sprocket 43, keyed as at 44 upon a shaft 45 which is journalled in bearings 46—46 mounted in the side plates. Shaft 45 carries a sweep-back roller 47, which co-operates with the hopper 28 as hereinafter described. The large sprocket 43 includes an integral sprocket 50 engaged by a sprocket chain 51 which drives a small sprocket 52 (Figure 1) keyed as at 53 upon a shaft 54 (Figure 15). Shaft 54 drives a pair of continuously rotating gears of the cotton feeding and severing station 33a and the station 33a includes also a second pair of gears which is operated intermittently as will be noted subsequently. An intermediate sprocket 55 is keyed upon a shaft 56 which is journalled in the side plates, shaft 56 constituting the drive shaft for one of the belts of the stick rotating apparatus 32.

It will be noted in Figure 1 that the main drive chain 42 also passes around a small sprocket 57 keyed upon a shaft 58 journalled in the side plates and that there is provided an idler sprocket 60 adjacent sprocket 57, loosely journalled upon a shaft 61 mounted upon the side plate to take up the slack in chain 42. Shaft 58 drives the other belt of the stick rotating apparatus. It will be observed that the chain and sprocket arrangement disclosed in Figure 1 provides a driving connection from pulley 37 (shown in broken lines in Figure 1) to sprocket 41, to drive the shaft 45 which extends through the side plates so as to transmit power to the driving apparatus on the opposite side of the machine.

As shown in Figures 2 and 5, the opposite end of shaft 45 carries an integral pair of sprockets 63 and 64, keyed as at 65 upon the end of the shaft. A sprocket chain 66 is engaged upon sprocket 63 and passes around a sprocket 52a keyed upon a shaft 54a similar to sprocket 52 and shaft 54 to drive a pair of continuously rotating pair of gears of the cotton feeding apparatus 33 for this side of the machine. The small drive sprocket 64 is connected by a sprocket chain 67 which engages the teeth of a large sprocket disk 68, keyed as at 70 (Figure 5) upon the main shaft 38. Sprocket disk 68 includes a series of spaced pins 71 which provide an intermittent drive for the second pair of gears of the cotton feeding apparatus 33 and the pins also actuate a stick agitator, generally indicated at 72. Sprocket chain 67 also passes over a sprocket 73, loosely journalled upon a shaft 74, in driving connection with a shaft arranged to provide a conveyor drive as hereinafter disclosed. It will be noted in Figure 5 that the conveyor drum 30 is keyed as at 75 to shaft 38 so that the disk sprocket 68 and conveyor drum rotate in unison. Upon the opposite end of shaft 38 there is keyed as at 76 a disk 68a provided with a series of pins 71a similar to disk 68 and pins 71, the pins 71 and 71a being in alignment with each other and with the cross slots 77 of the drum, disk 68a being arranged intermittently to actuate the second pair of intermittent feed gears of the cotton feeding apparatus 33a in the same manner as disk 68.

It will be apparent that the drive is transmitted from the primary driving sprocket 41 to cross shaft 45 to the opposite side of the machine to drive sprocket disk 68 which is keyed to shaft 38 such that disks 68 and 68a are driven in unison with the conveyor drum 30 which also is keyed to shaft 38. These disks therefore actuate the intermittent feed gears of the cotton feeders 33 and 33a in unison and in timed relationship with the sticks 27 nested in the cross grooves 77 of the drum in positions related to the actuating pins 71 and 71a of the disks. It will also be observed that the constantly driven feed gears of the cotton feeders 33 and 33a are driven uniformly by the chains 51 and 66 in timed relationship with the rotation of the disks 68 and 68a. The stick rotating apparatus, constituting two belt runs, also are driven at a fixed speed ratio by the chains 42 and 51. Thus, the entire mechanism is interconnected by the chains and sprockets in a simple manner, all of the parts being driven in the same direction at related speeds.

As shown in Figure 5, the conveyor drum 30 constitutes a central section 78 and end sections 79—79, each being provided with a hub 80 keyed individually as at 75 to the shaft 38. At opposite ends of the section 78 and interposed between the sections 79, there is a pair of V-belt pulleys 81—81, loosely journalled upon shaft 38, forming a part of the stick rotating apparatus and adapted to rotate at a speed in excess of drum rotation for spinning the sticks along their longitudinal axis as they are conveyed by the drum 30.

Stick hopper

Figure 4:
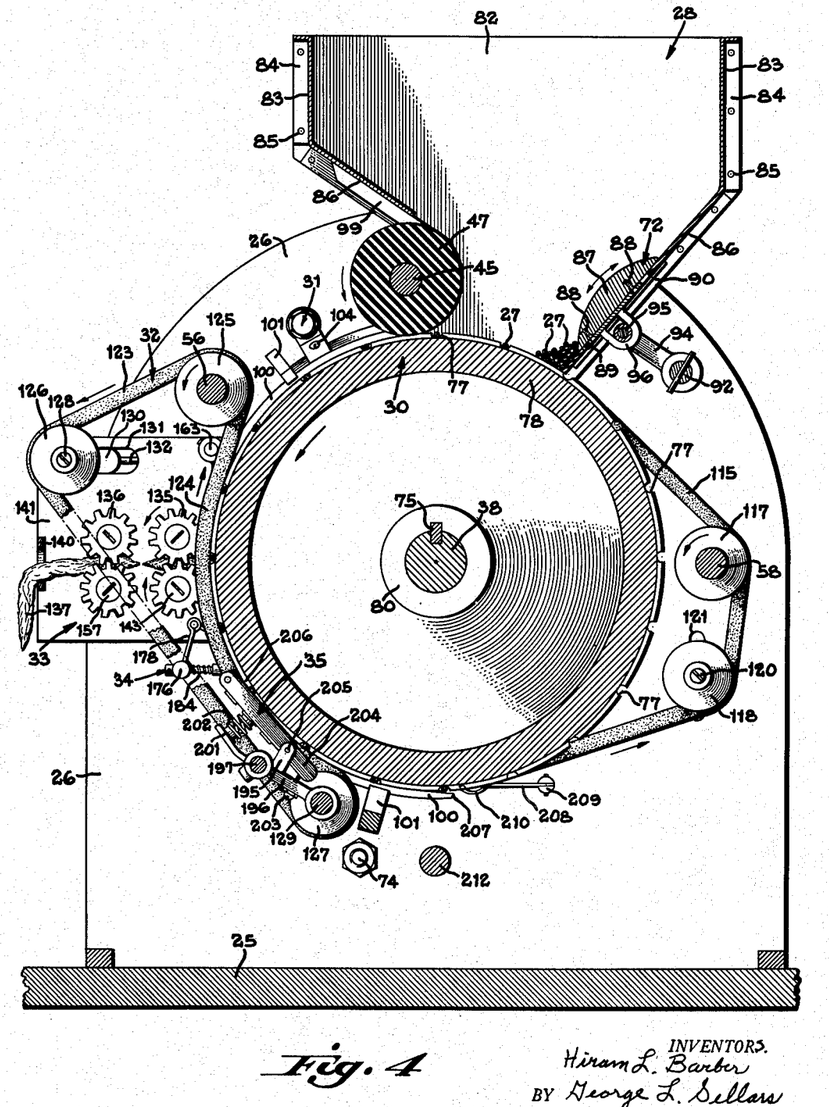
Figure 4 is a sectional view taken on line 4—4, Figure 3, illustrating the general arrangement of parts.

As shown in Figures 1 and 4, the stick hopper 28 constitutes a pair of side plates 82—82 secured to the upper portion of side plates 26—26, provided with end walls 83—83 having flanges 84 which are secured to the side plates 82 by means of screws 85. The upper end of the hopper is open and the lower portions of the end walls 83 converge toward each other as at 86—86 so that the sticks pass by gravity to the conveyor drum 30. In order to prevent the sticks from jamming, the rearward end wall 83 is provided with the above noted jogger or agitator unit 72. This unit constitutes an arcuate shoe 87 secured by screws 88 to a slide plate 89 (Figure 4) which is slidably mounted in a slot 90 formed in the converging portion 86 of the rearward end wall 83. The jogger is actuated by an arm 91 (Figure 2) secured upon a rock shaft 92 journalled in a bushing 93 mounted upon side plate 26. To the opposite end of shaft 92 there is pinned an arm 94, the swinging end of which includes a roller 95 engaging a stirrup 96, forming a part of shoe 87. Upon the end of arm 91 there is secured a cam 97 adapted to be engaged by the pins 71 of sprocket disk 68 such that the agitator is reciprocated by the pins as the sprocket disk rotates.

The cross slots 77 of the conveyor drum are slightly larger than the diameter of the sticks, each slot being capable of receiving but a single stick. During operation of the machine, the conveyor drum operates in the direction indicated by the arrow on Figure 4, and the sweep back roller 47 rotates in the same direction so that at the line of contact with the drum, the surface of roller 47 is moving toward the hopper in a direction opposite to the surface of the drum, therely tending to sweep back into the hopper the sticks which are not lodged in the cross slots. Thus, the agitator feeds the sticks continuously toward the conveyor drum to insure that a stick will lodge in each cross slot and the sweep back roller 47 serves as a separator to prevent more than a single stick from being lodged in the slots. The roller 47 rotates at a surface speed considerably greater than the surface speed of the drum by virtue of the chain and sprocket driving apparatus previously disclosed and the roller is formed from a resilient material such as soft rubber or plastic so as to establish frictional engagement with the sticks. The end wall 86 terminates slightly above roller 47 and in order to prevent sticks from passing through the opening between the wall and roller, the roller includes grooves 98—98 to receive a pair of fingers 99—99 which extend downwardly from wall 86 (Figures 3, 4 and 5).

Barbing station

After passing from the hopper, the opposite ends of the sticks pass beneath a pair of arcuate guide rails 100—100 extending around the forward portion of the drum from the hopper to a discharge point diametrically opposite, beneath the drum. The guide rails are spaced sufficiently from the circumference of the drum to hold the sticks securely within their respective grooves (Figures 4 and 17) and are mounted by brackets 101 which are secured to the side plates 26.

Figures 6, 16, 17:
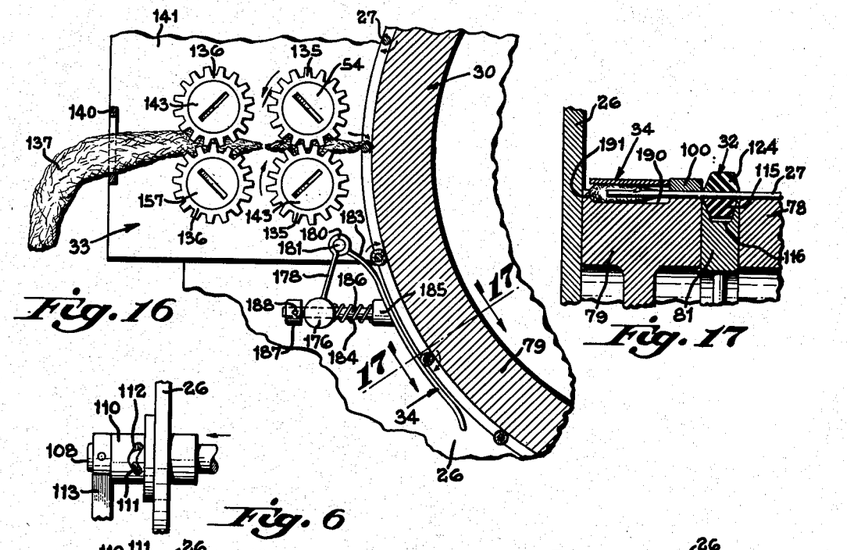
Figure 6 is a fragmentary top plan view taken from Figure 3, illustrating one of the stick barbing devices.
Figure 16 is an enlarged fragmentary view of the feeding apparatus taken from Figure 4, illustrating the operation of severing a tuft of cotton rope and advancing it to the end of an applicator stick for winding.
Figure 17 is a fragmentary cross sectional view taken on line 17—17, Figure 16, detailing the apparatus for performing the final operation of winding and forming the swab.
Figures 7, 9:
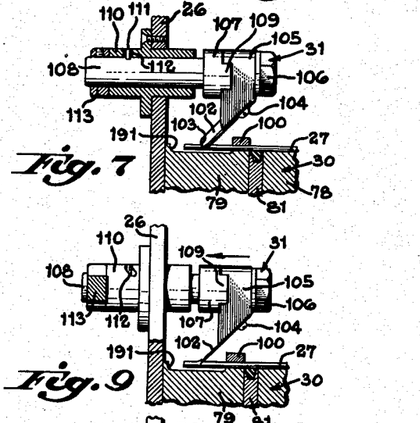
Figures 7 to 11 inclusive are fragmentary views illustrating the structure and operation of the barbing mechanism.

The barbing stations 31—31 are mounted upon the side plates 26 in a position to operate upon the ends of the sticks after they have passed from the hopper. As shown in Figure 3, these stations are in duplicate for the opposite ends of the stick and the detailed description therefore applies to both of them. Figures 6 to 12 inclusive illustrate the barbing station for the left hand side of the machine and as disclosed, each constitutes a cutting blade 102 having an arcuate cutting edge 103, the blade being maintained at an acute angle with respect to the axis of the stick 27. The blade is secured by a screw 104 to an angular mounting block 105 which is secured by a screw 106 to the head 107 of a rock shaft 108. Head 107 includes a key 109 engaging a slot formed in a block 105 to provide a non-rotative connection therewith. Shaft 108 is rotatably journalled in a bushing 110 secured to the side plate 26 (Figure 7). Shaft 108 includes a pin 111 engaged in an angular slot 112 formed in bushing 110 as shown in Figures 6 and 7.

Figure 8:
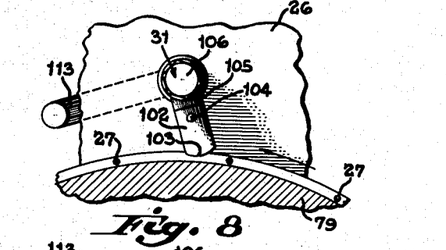
Figure 10:
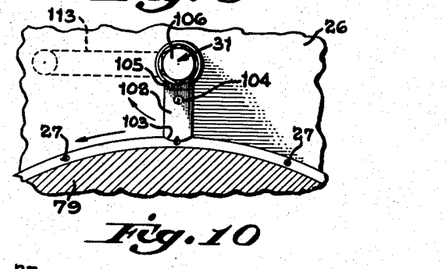

As shown in Figure 8, an arm 113 is secured upon the end of shaft 108 to bias the barbing blade by gravity at a normal angular position, the assembly being maintained in this position by engagement of the pin 111 in the slot 112. As the advancing stick contacts the cutting edge of blade 102, a wedging engagement is established by the cutting edge with the stick near its end, causing the blade to follow the stick as indicated by the arrows in Figure 10 counter to the biasing effect of arm 113. Rotative motion of the blade causes the pin 111 to follow the angular slot 112, causing the blade assembly to move longitudinally to the left as indicated in Figure 9. This causes the blade to dig partially into the stick as shown in Figure 12, severing the wood fibers and raising the severed fibers to form a barb. As the stick advances, pin 111 will pass the apex of slot 112, causing the assembly to move to the right as shown in Figure 11 to retract the cutting edge of the blade from the stick. When this occurs, the arm 113 returns the blade by gravity to the position shown in Figure 8, in position for the next successive stick.

It will be observed that the barbing apparatus is completely automatic in operation, powered by the advancement of the stick in the conveyor drum. The apparatus operates simultaneously upon both ends of the stick and the force is applied in opposite directions, therefore, the stick need not be firmly clamped in the drum. Sticks can be barbed at one end only by removing one blade and substituting a piece of fairly hard rubber shaped like the blade to clamp the stick while the other end of the stick is barbed.

Stick spinning apparatus

As above noted, the cotton fibers are wound upon the ends of the sticks by operation of the apparatus 32 as best shown in Figures 4 and 5. The V-belt pulleys 81—81, loosely journalled upon shaft 38, each carries a V-belt 115 engaged in the groove 116 of the pulley with the outer surface of the belt slightly above the bottom of slots 77 to contact the sticks. Each V-belt 115 passes over a drive pulley 117 keyed to and driven by the shaft 58. An idler pulley 118 journalled upon a shaft 120 takes up the slack in belt 115. The shaft of each idler pulley 118 passes through a slot 121 formed in the respective side plates 26, secured by a nut and washer 122 for adjustment purposes.

The driving apparatus (Figure 1) provides a speed ratio sufficient to drive shaft 58 and belt 115 in the same direction but at a higher surface speed than that of drum 30. The sticks are frictionally engaged against the portion of belt 115 passing around pulleys 81—81, by outside V-belts 123—123 driven at the same relative speed as belt 115 and having a return run 124, which travels in an opposite direction as indicated, engaged against the forward side of the pulleys 81—81. Thus, as shown in Figures 4 and 17, the sticks are frictionally engaged between belt 115 and run 124 to spin them. Each belt 123 is driven by the shaft and sprocket 55 and 56, each being engaged upon a respective V-pulley 125 secured upon shaft 56 and passing over an idler pulley 126 journalled upon a shaft 128. Shaft 128 is mounted upon a slide block 130 slidably mounted in a slot 131 and adjustable by means of a screw 132.

The lower end of belt run 124 passes over an idler pulley 127 mounted upon shaft 129 having its opposite ends secured to the end plates 26 as shown in Figure 3. The pulleys 117 and 125 are driven in the same direction as indicated by the arrows in Figure 4, and belts 115 and 123 both rotate in the same direction, but since run 124 is a return run, it travels in a direction opposite to belt 115. By virtue of the frictional engagement of the sticks between the respective belts 115 and belt run 124, the sticks are rolled at a relatively high rate of speed during their advancement toward the winding station so that the stick will pick up the leading fibers of cotton and wind the tuft rapidly upon the stick.

Cotton winding station

This apparatus severs the cotton rope into tuft lengths and presents the severed portions to the sticks to form the swabs. The apparatus is in duplicate for both ends of the sticks, therefore, the following description in the singular applies to the mechanism at both sides of the machine. This apparatus is indicated generally at 33 and 33a in Figures 3 and 4, and is detailed in Figures 13 to 17 inclusive. In general, each winding station constitutes two pairs of mating feed gears indicated at 135 and 136 (Figure 16). These gears are partially in mesh but there is provided a sufficient clearance between the teeth to permit the rope of cotton material 137 to pass therebetween to provide a positive feed. The pair of gears 136 are driven intermittently in synchronism with the rotation of the drum 30 while the gears 135 are driven continuously. At one portion of the operating cycle, indicated by the arrows in Figure 16, the intermittent gears 136 are stationary and gears 135 are in rotation thereby severing a length of cotton rope by pulling it apart, thus providing feathered ends. As shown, the leading end of the severed portion has been presented to the rapidly rotating stick for winding, the tuft being advanced for this purpose by the gears 135.

The cotton rope 137 is supplied in coil form and passes through an eye 140 secured to the mounting plate 141 of the winding apparatus to guide it to the feed gears. The constantly rotating pair of gears 135 for the respective winding stations are driven by the sprockets 52 and 52a (Figures 1 and 2) of the driving apparatus at respective opposite sides of the machine. As shown in Figure 15, sprocket 52 is keyed as at 53 to the shaft 54 and the upper feed gear 135 is keyed as at 142 to the inner end of shaft 54. The lower mating gear of the gear 135 is loosely journalled upon an idler shaft 143 secured to the side plate 141 by nut 144 (Figures 2 and 16).

Figure 13:
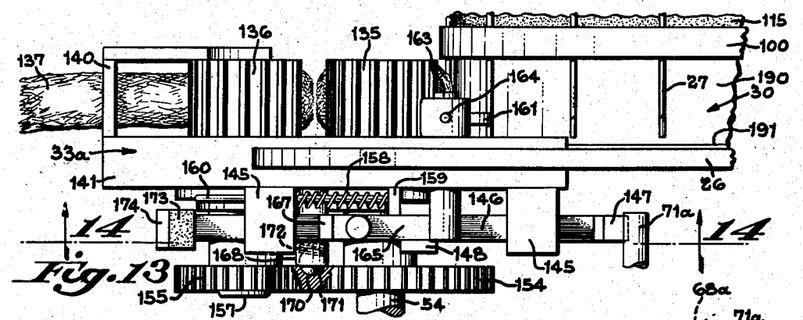
Figure 13 is an enlarged fragmentary top plan view illustrating the cotton feeding and severing apparatus.

The intermittent pair of feed gears 136 are driven by means of the pawl and ratchet arrangement illustrated in Figures 13 and 14. This structure also is in duplicate at opposite sides of the machine and therefore is described in the singular. The apparatus disclosed in Figures 13 and 14 is taken from Figure 1 in which the apparatus is intermittently actuated by the pin disk 68a, while the feeding apparatus as disclosed in Figure 2 is actuated in a similar manner by the sprocket disk 68.

As shown in Figure 14, plate 141 includes a pair of bearing blocks 145—145 arranged slidably to maintain a horizontally disposed slide bar 146 having an angular skid or cam 147 secured upon its end in position to be engaged successively by the pins 71a of disk 68a to cause a slide bar to be shifted intermittently to the left as indicated by the arrow. A bracket 148 is secured to the lower edge of the slide bar and a pawl 150 is pivotally mounted as at 151 upon the bracket. Pawl 150 is adapted successively to engage the teeth of a ratchet wheel 152, the pawl being spring urged toward the ratchet by means of a spring 153, under compression between the pawl and slide bar. Ratchet 152 is loosely journalled upon the shaft 54 (Figure 15) and includes a gear 154 meshing with a gear 155, keyed as at 156 to shaft 157. To the opposite end of shaft 157 is keyed the lower feed gear of the intermittent pairs of gears 136. The pins 71a correspond in spacing and number to the stick carrying cross slots of the conveyor drum so that the ratchet is advanced one tooth for each stick. By virtue of the ratio between gears 154 and 155, each advancement of the ratchet advances the intermittent gears 136 sufficiently to measure the required length of cotton rope. Since the pair of gears 135 rotates continuously, the rope will be severed between the respective pairs of gears when pair 136 stops and pair 135 continues rotating. The timing is such that the end of the severed tuft is presented to the drum before the stick reaches its pick-up position. When the stick contacts the loose cotton fibers, the barb engages the fibers and the cotton is wound upon the stick as indicated in Figure 16, the gears 135 advancing the cotton continuously during winding operation.

As shown in Figure 13, a spring 158 is maintained under compression between a lug 159 and the left hand slide bearing 145 to return the slide bar to its normal right hand limit of travel after its actuating stroke. Spring 158 is loosely engaged over a rod 160 having one end fixed to lug 159, with its opposite end slidably supported in the bearing block 145.

In order to prevent the cotton rope from being fed to the drum when the stick hopper is empty or if one of the cross slots 77 does not contain a stick, there is provided a feeler 161 (Figures 13 and 14) which prevents operation of the slide bar for that particular slot or slots. This apparatus constitutes a rock shaft 163 loosely journalled in plate 141, the feeler 161 being pinned to the end of this shaft as at 164. The opposite end of shaft 163 includes a latch arm 165 engageable with a lug 166 extending from the upper edge of the slide bar 146. When the slide bar is retracted at the limit of its feeding stroke, the lug 166 passes slightly beyond the end 167 of latch arm 165. At this moment one of the sticks passes under the feeler 161 to elevate arm 165 to unlatching position so that the slide bar is free to return to its starting position under the influence of spring 158 for the next feeding cycle. If, however, there is no stick in the groove at this point, the feeler will not be actuated and the arm 165 will remain in latching position with its end 167 engaging lug 166 to lock the latch bar in retracted position.

In order more clearly to disclose the operation of the feeler, the sticks being carried by the conveyor drum are indicated at A, B and C and the corresponding pins are indicated at A', B' and C'. In the position shown in Figure 14, the tuft of cotton for stick A has been severed and is being fed by the feeder gears 135 and wound upon stick A. At the same time a length of cotton rope for stick B is just beginning to be advanced by pin B' with the slide bar 146 at the beginning of its feeding stroke, driving the intermittent feeder gears 136 as indicated by the arrows in Figure 14. The feeding stroke will continue for its complete cycle and when bar 146 is fully retracted, the stick C will engage feller 161 to elevate latch arm 165. If stick C is missing, however, the latch arm will remain in its lowered position with its end 167 engaged against lug 166 to prevent the latch bar from returning to its starting position. Therefore, when pin C' reaches its operating position relative to cam 147, the mechanism will be inoperative and the intermittent feeder gears 136 will remain stationary. When the groove for stick C reaches the winding station, the feeder gears 135 will be devoid of cotton and this condition will continue until the feeler again is tripped by a subsequent stick, whereupon arm 165 will be elevated and the slide bar 146 advanced by spring 158 to resume the intermittent feeding operation. When that stick reaches its pick-up position adjacent gears 135, a corresponding tuft of cotton will be in position for winding. By virtue of this arrangement, cotton is withheld automatically whenever a stick is missing from the conveyor drum to prevent the winding station from advancing more than one length of cotton rope for any given stick. If the feeler structure were omitted, the unused tufts of cotton may drop into the machine and cause mechanical troubles.

In order accurately to index the ratchet 152, there is provided a detent element comprising a sleeve 168 secured upon plate 141 behind gear 154, with its end open to the gear. The face of the gear is provided with a series of detent notches 170, one for each tooth of the ratchet and engaged by a ball 171 contained within the sleeve 168 and under compression by spring 172 contained within the sleeve. This structure locks gear 154 and ratchet 152 against rotation during the return stroke of the slide bar 146.

The slide bar is provided with a cushion 173 at its left end as viewed in Figures 13 and 14. This cushion constitutes a stop engageable against left bearing block 145 and is formed from rubber or other resilient material to absorb the shock when the slide bar snaps to its right hand position under the influence of spring 158. Cushion 173 is secured in place upon the end of the slide bar by means of an end plate 174 secured to the bar by screw 175.

After passage of the sticks from the winding station with the cotton rope wound loosely upon the ends thereof, the ends of the sticks pass under the spring loaded forming shoe 34 (Figures 3, 16 and 17). Shoe 34 is yieldably mounted and presses the loosely wound swabs against the drum to wind the cotton more firmly upon the sticks and reduce each swab to a uniform size and shape. There is, of course, provided a pair of shoes, one for each end of the stick, the shoes being secured to the respective side plates 26 by means of studs 176, each stud having a threaded shoulder passing through the side plate and secured by a nut 177.

As shown in Figures 3 and 16, stud 176 includes a vertical arm 178 formed of relatively thin yieldable metal, the upper end of which is curled as at 180 to receive a pin 181 providing a hinged connection for the upper end of shoe 34 which is curled as at 182 about the pin. Shoe 34 is formed of relatively thin sheet metal and its receiving end is flared as at 183 to receive the swab ends and reduce them gradually in size as the sticks advance into the shoe. The mounting arm 178 being yieldable, permits the receiving end of the shoe to move outwardly as the swabs pass therein. The intermediate portion of the shoe is concentric with the circumference of the feeding drum and is urged toward the drum by a spring 184 maintained under compression between the stud 176 and a boss 185 secured to the shoe. A guide rod 186 is secured to the boss 185 and has its opposite end slidably engaged in the stud 176. A collar 187 is pinned as at 188 to the opposite end of rod 186 to serve as a stop against stud 176 and prevent the shoe from contacting the drum.

As shown in Figure 17, the drum is grooved as at 190, the outer end of the groove including a fillet 191 to form the rounded end of the swab. It will be observed that the sticks are rotated by the belts as they pass through the shoes so that the pressure of the shoe, combined with the rotation of the stick, winds the cotton tuft firmly upon the stick, reduces the swabs to uniform size and shape and anchors the cotton fibers firmly to the barb to prevent endwise displacement.

Stick grooving station

After passing through shoe 34 and while still rotating, the sticks are engaged centrally by the grooving unit 35 (Figures 3, 4 and 18 to 20 inclusive). This unit constitutes a grooving blade 192 mounted between a pair of bars 193—193, the upper ends of the bars and blade being secured together by a pin 194. The assembly is pivotally mounted at its lower end by means of ears 195 extending upwardly from an arm 196 (Figure 4) having an end journalled on shaft 129. The opposite end of arm 196 is mounted upon a cross bar 197 (Figure 3) having its opposite ends secured by nuts 198 to the side plates 26—26. The arm 196 thus is supported by the shafts 197 and 129 and is locked in place laterally upon shaft 197 by a set screw 200. Arm 196 further includes an upwardly extending lug 201 and a spring 202 is maintained in compression between lug 201 and the grooving unit 35 to urge the unit toward the conveyor drum. In order to adjust the cutting edge of blade 192 with respect to the sticks, an adjustment screw 203 is threaded through arm 196, with its inner end in engagement with an end 204 of the grooving unit. Since the unit is pivotally mounted as at 205 upon ears 195, the pivot forms a fulcrum such that the cutting portion of the unit may be backed away from the sticks against the compression of spring 202 by turning the adjustment screw inwardly.

In operation, the grooving unit 35 is adjusted to partially sever the stick by virtue of the rotation of the stick as it passes along the cutting edge of the blade, a preferred grooving operation being illustrated in Figures 20 and 21. In order to provide clearance for the edge of the grooving blade, the conveyor drum is provided with a centrally located groove 206 (Figures 3, 4 and 5).

After passing the grooving unit, the sticks continue rotating until they pass beyond the belt run 124 (Figure 4) and rotation of the drum carries the sticks to the end 207 of the arcuate guide shoe 100 for discharge from the machine. The sticks are ejected from their groove by means of a pair of ejector fingers 208—208 (Figures 4 and 5) which are mounted upon studs 209—209 secured to the machine side plates 26—26. The fingers 208 are formed from yieldable sheet metal and their forward ends are curved as at 210. These curved ends extend into the respective grooves 190, and the ends of the fingers are in contact with the bottoms of the grooves for engaging the sticks and discharging them positively from the cross slots 77.

As shown in Figures 2 and 3, the sprocket 73 at the lower portion of the machine includes a gear 210 meshing with a gear 211 keyed to a cross shaft 212. The cross shaft is journalled in bushings 213—213 secured to the side plates 26—26. Shaft 212 may be provided with a roller (not shown) to receive a conveyor belt extending horizontally to receive the finished applicators as they are discharged by the displacement fingers and to convey them to a packaging station. If desired, the conveyor may be omitted and a gravity discharge chute, opening into the base plate 25, may be provided in its stead.

Having described our invention, we claim:

1. A machine for making swab sticks comprising, a conveyor arranged to advance the sticks continuously in spaced relationship through the machine, means adapted to form a barb in the sticks as they are advanced, feeder means arranged to present tufts of cotton into the path of advancement of the barbed portion of the sticks in timed relationship with the advance of the sticks, means for spinning the sticks about their longitudinal axes as they are advanced relative to the feeder means whereby the cotton is wound upon the sticks by rotation during advancement thereof, and means frictionally engaging the tufts of cotton against the conveyor during rotation after the tufts are wound upon the sticks to anchor the tufts firmly upon the barbs.

2. A machine for forming swab sticks comprising, a rotatable conveyor drum adapted to advance the sticks continuously in spaced relationship through the machine in a circular path, means for feeding sticks individually to the conveyor drum, a pair of barbing stations located on said circular path adapted to penetrate the opposite ends of the sticks partially in opposite directions at an angle to the axes of the sticks as they are advanced relative to the barbing stations to form barbs in the sticks, means for rotating the advancing sticks around their longitudinal axes after the barbing operation, and a pair of feeding stations disposed at opposite ends of the sticks and adapted to present tufts of cotton into the circular path of movement of the rotating sticks in timed relationship with the advance thereof, said barbs being adapted to engage the fibers of the tufts and wrap the same about the stick during rotation and advancement thereof and to anchor the tufts firmly upon the sticks.

3. A machine for forming applicator sticks having a cotton swab at opposite ends comprising, a rotatable conveyor drum adapted to advance the sticks continuously through the machine in spaced relationship, means for rotating the sticks along their longitudinal axes during the continuous advancement of the sticks, a pair of cotton feeding stations disposed at opposite ends of the sticks and adapted to present tufts of cotton into the path of advancement of the rotating sticks in timed relationship with the advance of the sticks whereby the tufts of cotton are wound upon the sticks during the continuous advancement thereof to form double ended applicators, and a stationary grooving blade located on the path of movement of the sticks for weakening the sticks at a point along their length adapting them to be broken to form pairs of single ended applicators.

4. A machine for forming applicator sticks having a cotton swab at opposite ends comprising, a rotatable conveyor drum adapted to advance the sticks continuously in spaced relationship through the machine, means for feeding sticks individually to the conveyor drum, a pair of barbing stations adapted to form barbs at the opposite ends of the sticks as they are advanced, means for rotating the sticks around their longitudinal axes during the continuous advancement thereof after the barbing operation, a pair of cotton feeding stations disposed at opposite ends of the sticks and adapted to present tufts of cotton to the barbed ends of the rotating sticks in the path of advancement of the sticks in timed relationship with the advance thereof whereby the tufts are wound upon the sticks during rotation and advancement thereof and anchored by the barbs to form double ended applicators, and means adapted to weaken the sticks at a point along their length adapting them to be broken to form pairs of single ended applicators.

5. A machine for barbing sticks and forming a cotton swab upon the end thereof comprising, a rotary conveyor drum having means for advancing the sticks continuously through the machine, a barbing station adapted to form a barb in the sticks as they are advanced relative to the station, the barbing station including a cutter blade angularly related to the longitudinal axes of the sticks and adapted to establish a wedging engagement with the sticks during advance thereof and to swing in an arc to cause the blade to penetrate the sticks and raise a barb thereon, a cotton feeding station adapted to present tufts of cotton to the sticks after the barbing operation, and means for spinning the sticks around their longitudinal axes whereby the cotton is caused to wind itself about the sticks to form a swab anchored upon said barb.

6. A machine for barbing sticks and forming cotton swabs upon the ends thereof comprising, a rotary conveyor having seats for engaging and advancing the sticks continuously through the machine in spaced relationship, a barbing station adapted to form a barb in the opposite ends of the sticks as they are advanced relative to the station, the barbing station including a pair of barbing blades angularly related in opposite directions to the longitudinal axes of the stick and adapted to establish a wedging engagement with the sticks during advance thereof and arranged to swing in an arc during passage of a stick thereunder, the blade including means for shifting the same longitudinally relative to the axis of the stick during its swinging movement to penetrate a stick partially and raise a barb thereon, a cotton feeding station adapted to present tufts of cotton to the opposite ends of the sticks after the barbing operation and means for spinning the sticks about their longitudinal axes whereby the cotton is caused to wind itself about the sticks to form swabs anchored upon said barbs.

7. A machine for forming swab sticks comprising, a frame, a conveyor drum rotatably mounted within the frame and having a series of seats formed in its circumference adapted to receive and advance the sticks through the machine in spaced relationship with each other, a barbing station adapted to form a barb in the sticks as they are advanced relative to the station, the barbing station including a barbing blade angularly related to the longitudinal axis of the stick, the blade being secured upon a rock shaft journalled in the frame of the machine, means for biasing the the blade at an angle opposed to the direction of drum rotation, the lower end of the blade constituting a cutting edge adapted to contact and establish a wedging engagement with an advancing stick and to follow the stick during its advance, a cam associated with said rock shaft and adapted to shift the shaft longitudinally during the swinging movement of the blade to cause the blade to penetrate a stick partially and raise a barb thereon during the continuous advance of the stick, means for spinning the sticks along their longitudinal axes after the barbing operation and means for presenting tufts of cotton to the barbed ends of the rotating sticks to cause the tufts to be wound about the sticks to form swabs anchored upon said barbs.

8. A machine for forming swab sticks comprising, a frame, a conveyor drum rotatably mounted within the frame and having a series of slots formed in its circumference adapted to receive and advance the sticks through the machine in spaced relationship with each other, a barbing station adapted to form a barb in the sticks as they are advanced relative to the station, the barbing station including a barbing blade angularly related to the longitudinal axis of the stick and secured upon a rock shaft, means for biasing the blade at an angle opposed to the direction of drum rotation, the lower end of the blade constituting a cutting edge adapted to contact and establish a wedging engagement with an advancing stick and to follow the stick during its advance, a cam bushing providing a journal for the opposite end of the rock shaft, the bushing having a V-shaped slot and the rock shaft having a pin secured therein adapted to traverse the slot and shift the shaft and blade longitudinally during the swinging movement of the blade to cause the blade to penetrate a stick partially then retract and return to its normal angular position, means for spinning the sticks along their longitudinal axes after the barbing operation and means for presenting tufts of cotton to the barbed ends of the rotating sticks to cause the tufts to be wound about the sticks to form swabs anchored upon said barbs.

9. A machine for forming swab sticks comprising, a rotary conveyor having a series of seats adapted to receive and advance the sticks continuously through the machine in a circular path and in spaced relationship with each other, means on said circular path for barbing the ends of the sticks as they are advanced by the conveyor, means for spinning the sticks around their longitudinal axes after barbing the same, a mating pair of continuously driven feeder elements adapted to engage a length of cotton rope therebetween and advance the rope, and a second mating pair of feeder elements adapted to engage the cotton rope therebetween and advance the same intermittently, said second pair of feeder elements being actuated in timed relationship with the advance of the sticks in the conveyor to cause the cotton rope to be severed between the intermittent and constantly driven pairs of elements due to the rotation of the continuous pair while the intermittent pair is stationary, the pairs of feeder elements being arranged to present the severed tufts of cotton into the circular path of movement in timed relationship to the advance of the spinning sticks to cause the tufts to be wound upon the sticks to form swabs during the rotation and advancement of the sticks.

10. In a machine for forming swab sticks including a rotary conveyor having a series of seats adapted to receive and advance the sticks continuously through the machine in spaced relationship with each other and means for spinning the sticks along their longitudinal axes as they are advanced by the conveyor, a cotton tuft feeding mechanism comprising, a pair of continuously rotating feeder gears adapted to present tufts of cotton to the ends of the spinning stick to be wound thereon, driving means for rotating said pair of gears in timed relationship with the advance of the sticks, a second pair of feeder gears, a disk having a series of pins corresponding to the seats in said conveyor drum, means actuated by said pins to advance said second pair of feeder gears intermittently in timed relationship with the advance of the sticks in the conveyor seats to cause a measured length of cotton rope to be advanced to the constantly driven pair of gears in a position to intercept an advancing stick, the measured length being severed from the cotton rope between said pairs of gears due to rotation of the continuous pair while the intermittent pair is stationary.

11. In a machine for forming swab sticks including a rotary conveyor having a series of seats adapted to receive and advance the sticks through the machine in spaced relationship with each other and means for spinning the sticks as they are advanced continuously by the conveyor, a cotton tuft feeding mechanism comprising, a pair of continuously rotating feeder gears adapted to present tufts of cotton to the ends of the spinning sticks to be wound thereon, driving means for rotating said pair of gears in timed relationship with the advance of the conveyor drum, a second pair of feeder gears adapted intermittently to feed a predetermined length of cotton rope to said first pair of feeder gears, a ratchet wheel connected to said second pair of feeder gears, a pawl associated with said ratchet wheel, and a disk having a series of pins corresponding to the seats in said conveyor rotatable with the conveyor drum and adapted to actuate said pawl to advance the ratchet wheel and second pair of feeder gears in timed relationship with the advance of the conveyor drum to cause the cotton rope to be severed between the first and second pairs of gears due to the continuous rotation of the first pair while the second pair is stationary.

12. In a machine for forming swab sticks including a rotary conveyor having a series of seats adapted to receive and advance the sticks continuously through the machine in spaced relationship with each other and means for spinning the sticks as they are advanced by the conveyor, a cotton tuft feeding mechanism comprising, a pair of continuously rotating feeder gears adapted to engage a length of cotton rope between the mating teeth thereof and advance the rope, driving means for rotating said pair of gears in timed relationship with the advance of the conveyor drum, a second pair of feeder gears adapted to engage the cotton rope and advance the same, a ratchet wheel connected to said second pair of feeder gears, a pawl associated with said ratchet wheel, a disk having a series of pins corresponding to the seats in said conveyor rotatable with the conveyor drum and adapted to actuate said pawl to advance the ratchet wheel and second pair of feeder gears in timed relationship with the advance of the conveyor drum to cause the cotton rope to be severed between the first and second pairs of gears due to the continuous rotation of the first pair while the second pair is stationary, the pairs of gears being arranged to present the severed tuft to a spinning stick to be wound thereon, and an interlock interconnecting the conveyor drum and pawl, said interlock operable to latch the pawl in an inoperative position when a stick is omitted from a seat in the conveyor drum to render the second pair of feeder gears inoperative for that seat.

13. In a machine for forming swab sticks including a rotary conveyor drum having a series of seats adapted to receive and advance the sticks through the machine in spaced relationship with each other and means for spinning the sticks along their longitudinal axes as they are advanced by the conveyor drum, a cotton tuft feeding mechanism comprising, a pair of continuously rotating feeder gears adapted to engage and advance tufts of cotton therebetween to be presented to the spinning stick and wound thereon, driving means for rotating said pair of gears in timed relationship with the advance of the sticks, a second pair of feeder gears adapted intermittently to feed a measured length of cotton rope to said first pair of feeder gears, a pawl and ratchet wheel operatively connected to said second pair of feeder gears to drive the same, a slide bar for mounting the pawl, and a disk driven in unison with the conveyor drum having a series of pins corresponding to the seats in the drum and adapted to reciprocate the slide bar to advance said second pair of feeder gears intermittently in timed relationship with the advance of the sticks in the conveyor seats to cause the cotton rope to be severed between the first and second pairs of gears due to the continued rotation of the first pair while the second pair is stationary.

14. In a machine for forming swab sticks including a rotary conveyor drum having a series of seats adapted to receive and advance the sticks through the machine in spaced relationship with each other and means for spinning the sticks along their longitudinal axes as they are advanced by the conveyor drum, a cotton tuft feeding mechanism comprising, a pair of continuously rotating feeder gears adapted to engage and advance tufts of cotton therebetween to be presented to the spinning stick and wound thereon, driving means for rotating said pair of gears in timed relationship with the advance of the sticks, a second pair of feeder gears adapted intermittently to feed a measured length of cotton rope to said first pair of feeder gears, a pawl and ratchet wheel operatively connected to said second pair of feeder gears to drive the same, a slide bar for mounting the pawl, a disk driven in unison with the conveyor drum having a series of pins corresponding to the seats in the drum and adapted to reciprocate the slide bar to advance said second pair of feeder gears intermittently in timed relationship with the advance of the sticks in the conveyor seats to cause the cotton rope to be severed between the first and second pairs of gears due to the continued rotation of the first pair while the second pair is stationary, and a latch arm pivotally mounted relative to the slide bar having a feeler adapted to contact the sticks in the conveyor drum, the latch arm being shifted to an unlatching position upon contact of the feeler with a stick and being shifted to a position to latch the slide bar in an inoperative position when a stick is omitted from one or more seats of the conveyor drum automatically to halt the feeding of cotton rope to the empty seats.

15. In a machine for forming applicator sticks having cotton swabs at opposite ends including a rotary conveyor drum having a series of seats adapted to advance applicator sticks through the machine in spaced relationship with each other and means for spinning the sticks along their longitudinal axes as they are advanced by the conveyor drum, a cotton tuft feeding mechanism comprising, pairs of continuous feeder gears at opposite ends of the conveyor drum adapted to engage and advance cotton rope, driving means for rotating said pairs of gears in unison and in timed relationship with the advance of the sticks, a respective second pair of feeder gears correlated to each of said first pairs and adapted to feed cotton rope intermittently, a ratchet wheel connected respectively to each of said intermittent pairs of feeder gears, a disk for each of said ratchet wheels, each disk having a series of pins corresponding to the seats in the conveyor drum and adapted to actuate said respective pawls to advance the intermittent feeder gears in unison and in timed relationship with the advance of the conveyor drum to cause the cotton rope at both ends of the conveyor drum to be severed between the first and second pairs of gears and presented to the sticks due to the rotation of the continuous pair while the intermittent pair is stationary, said conveyor drum and disks being secured upon a common shaft for unitary movement.

16. A machine for winding a tuft of cotton about an applicator stick comprising, a rotatable conveyor drum having a series of seats spaced around its circumference and adapted to advance the sticks through the machine, means for forming a barb upon the end of the sticks as they are conveyed, a pulley rotatably mounted upon the axis of the conveyor drum, a belt engaged upon the pulley, means for driving said belt, said belt extending beyond the bottom of the seats sufficiently to contact the sticks lodged in said seats, a second belt disposed adjacent said pulley and having driving means for rotating the same, said second belt including a run moving in a direction opposite to that of the pulley with the sticks frictionally engaged between said belts to rotate the sticks during their advance, and a cotton feeder adapted to present tufts of cotton to the barbed end of the rotating sticks in timed relationship with the advance thereof to cause the tufts to be wound upon the end of the sticks to form swabs.

17. In a machine for forming swab sticks having a cotton feeding station, a conveyor for advancing the sticks continuously in a circular path relative the feeding station, means for spinning the sticks around their longitudinal axes as they are advanced relative to said station comprising, a rotary conveyor drum having a series of seats adapted to receive and advance the sticks through the machine in spaced relationship, said drum being fixed upon a shaft rotatably mounted within the machine, and having transmission means for driving the same, the drum being divided into sections longitudinally along the shaft and having pulleys interposed between the sections and journalled loosely upon said shaft, a respective belt passing over said pulleys, transmission means for driving said belts and pulleys at a rate greater than the speed of rotation of the conveyor drum, a respective belt run for each of said pulleys engaged across the face of the pulleys and frictionally engaging the sticks against the belts passing over said pulleys to rotate the sticks during their advance by the conveyor, the said cotton feeding station being adapted to feed tufts of cotton into the path of movement of the rotating sticks whereby the cotton is wound about the sticks to form swabs thereon.

18. A machine for forming applicator sticks having a cotton swab at opposite ends comprising, a rotatable conveyor drum adapted to advance the sticks in a circular path continuously through the machine in spaced relationship, means for rotating the sticks along their longitudinal axes during the continuous advancement of the sticks, a pair of cotton feeding stations disposed at opposite ends of the sticks and adapted to present tufts of cotton to the rotating sticks in timed relationship with the advance of the sticks whereby the tufts of cotton are wound upon the sticks to form double ended applicators, and a fixed grooving blade disposed adjacent the conveyor drum and arranged to contact the rotating sticks as they are advanced by the conveyor to cut a groove at a point along the length of the sticks adapting them to be broken at the groove to form pairs of single swab applicators.

19. A machine for winding a tuft of cotton about an applicator stick comprising, a rotatable conveyor drum having a series of seats spaced around its circumference and adapted to advance the sticks through the machine, means for forming a barb upon the end of the sticks as they are conveyed, a pulley rotatably mounted upon the axis of the conveyor drum, a belt engaged upon the pulley, means for driving said belt, said belt extending beyond the bottom of the seats sufficiently to contact the sticks lodged in said seats, a second belt disposed adjacent said pulley and having driving means for rotating the same, said second belt including a run moving in a direction opposite to that of the pulley with the sticks frictionally engaged between said belts to rotate the sticks during their advance, a cotton feeder adapted to present tufts of cotton to the barbed end of the rotating sticks in timed relationship with the advance thereof to cause the tufts to be wound upon the end of the sticks to form swabs, the conveyor drum having a circumferential groove shaped in cross section to form a swab, and a shoe adjacent the groove arranged to engage the cotton tuft against the groove to shape the rotating tuft to the contour of the groove.

20. A machine for winding a tuft of cotton about an applicator stick comprising, a rotatable conveyor drum having a series of seats spaced around its circumference and adapted to advance the sticks through the machine, means for forming barbs upon the ends of the sticks as they are conveyed, a pulley rotatably mounted upon the axis of the conveyor drum, a belt engaged upon the pulley, means for driving said belt, said belt extending beyond the bottom of the seats sufficiently to contact the sticks lodged in said seats, a second belt disposed adjacent said pulley and having driving means for rotating the same, said second belt including a run moving in a direction opposite to that of the pulley with the sticks frictionally engaged between said belts to rotate the sticks during their advance, a cotton feeder adapted to present tufts of cotton to the barbed ends of the rotating sticks in timed relationship with the advance thereof to cause the tufts to be wound upon the end of the sticks, the conveyor drum having a circumferential groove at opposite ends thereof located behind the ends of the sticks, the grooves being contoured in cross section to form a swab and a yieldable arcuate shoe adjacent each of said grooves, the shoes being located to engage the wound tufts against the grooves to frictionally retard rotation of the tuft to wind it firmly upon the stick and shape the rotating tufts during advancement to the contour of the groove.

HIRAM L. BARBER.
GEORGE L. SELLARS.

REFERENCES CITED

The following references are of record in the file of this patent:

UNITED STATES PATENTS

| Number | Name | Date |
| --- | --- | --- |
| 1,721,815 | Gerstenzang | July 23, 1929 |
| 1,921,604 | Bunnell et al. | Aug. 8, 1933 |
| 2,228,599 | Glickston | Jan. 14, 1941 |
| 2,253,852 | Glickston | Aug. 26, 1941 |
| 2,430,648 | Schonrock | Nov. 11, 1947 |